UNITED STATES PATENT OFFICE.

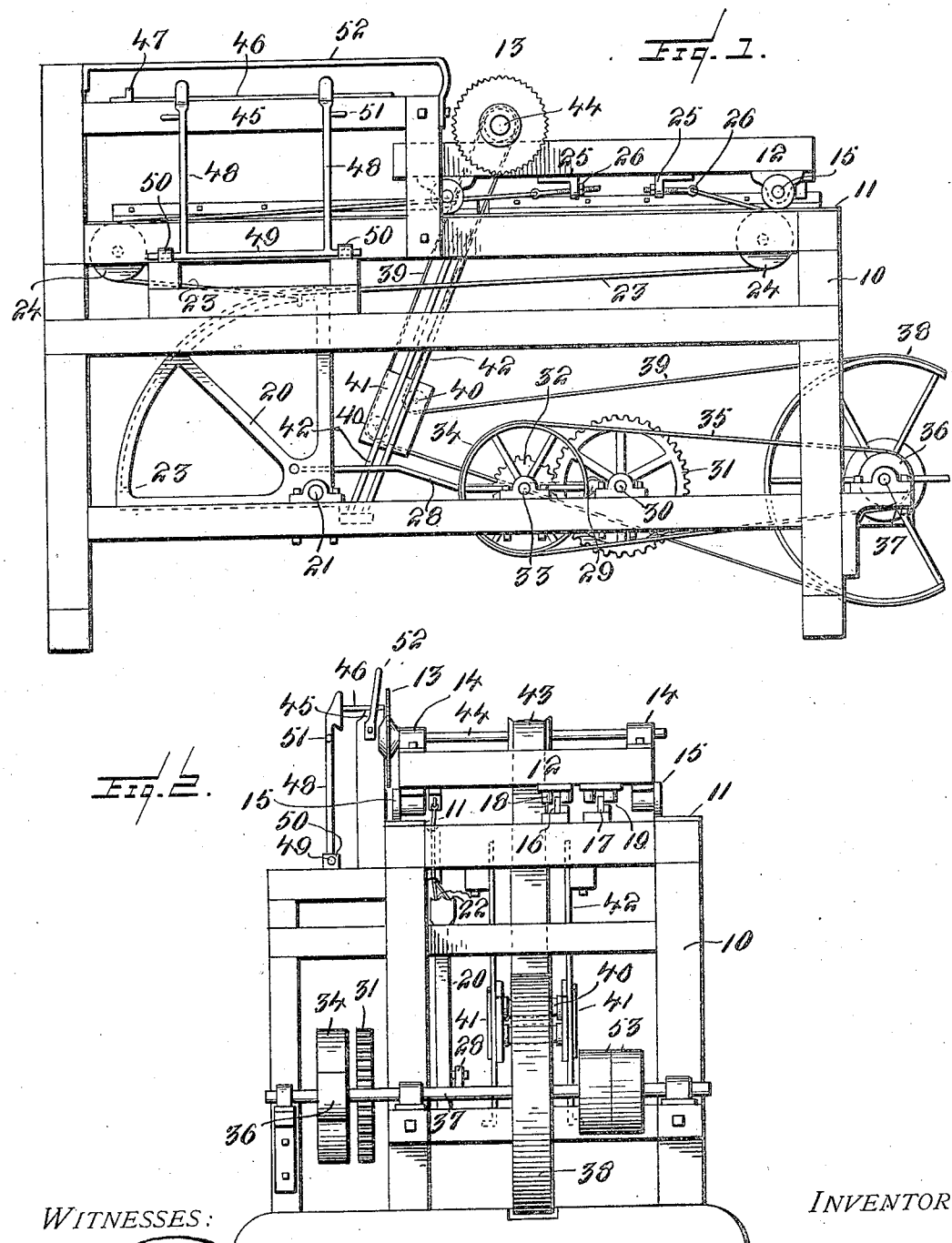

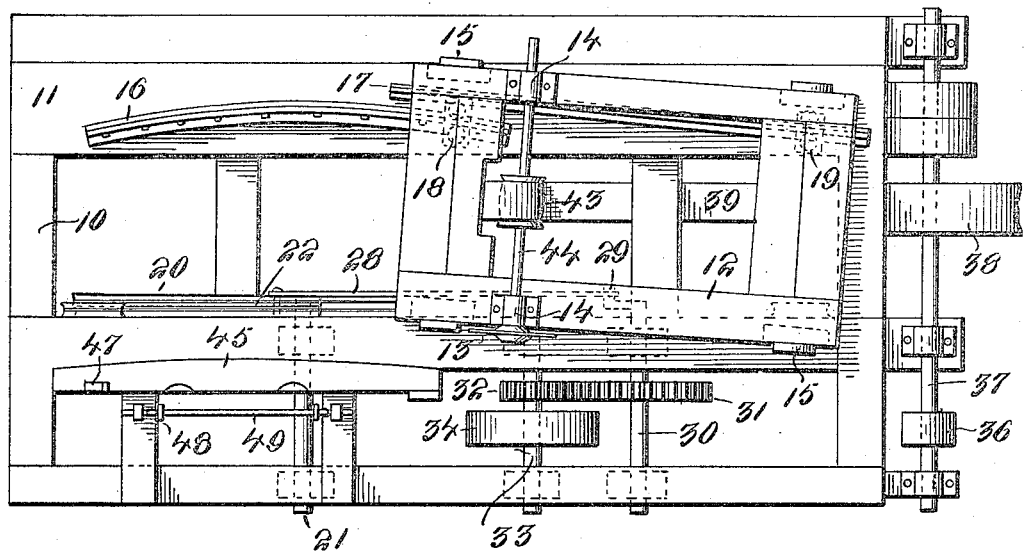

NOAH M. TAYLOR, OF MEMPHIS, TENNESSEE.

STAVE-JOINTING MACHINE.

942,799. Specification of Letters Patent. Patented Dec. 7, 1909.

Application filed May 14, 1909. Serial No. 495,997.

*To all whom it may concern:*

Be it known that I, NOAH M. TAYLOR, a citizen of the United States, residing at Memphis, county of Shelby, and State of Tennessee, have invented certain new and useful Improvements in Stave-Jointing Machines, of which the following is a specification, reference being had therein to the accompanying drawing.

This invention relates to a stave jointing machine, and particularly to a structure embodying a traveling saw adapted to cut a curved face upon the stave.

The invention has for an object to provide a novel and improved construction of means for moving the traveling saw carriage and guiding the same in a curved path together with improved means for transmitting power to the saw in the different positions of the carriage.

A further object is to provide novel and improved means for supporting and presenting the staves to be cut to the saw.

Other and further objects and advantages of the invention will be hereinafter fully set forth and the novel features thereof defined by the appended claims.

In the drawing:—Figure 1 is a side elevation of the machine; Fig. 2 is an end view thereof; Fig. 3 is a top plan; Fig. 4 is a detail plan of the guide rails; Fig. 5 is a detail elevation of the carriage connection with these rails; Fig. 6 is a plan showing the position of the staves for the final sawing thereof; Fig. 7 is a detail of the completed stave.

Like numerals refer to like parts in the several views of the drawing.

The numeral 10 designates the frame of the machine which may be of any desired size or configuration, and is provided at its upper portion with tracks or ways 11 upon which the saw carriage 12 is adapted to travel. This carriage is provided with a saw 13 mounted in bearings 14 upon the carriage. The carriage is also provided with wheels 15 adapted to travel on the tracks 11. One portion of this track is provided with the curved guide rail 16 and the straight guide rail 17 extended beyond one end of the curved guide. These rails are adapted to engage any desired projections from the carriage, such, for instance, as the friction rollers 18 depending from the carriage at opposite sides of the rail 16, as shown in Fig. 5. The opposite end of the carriage is provided with similar rollers 19 engaging the straight rail 17 which imparts to the rear of the carriage the necessary motion to keep the saw parallel with the cut in the stave formed during the curved path of travel of the saw and of the front end of the carriage by its engagement with the guide 16.

The connections between the carriage frame and the straight and curved guide rails are such as to permit a pivotal or swinging movement of the carriage frame laterally on the tracks 11 by reason of the limited contact with them and rolling movement of the friction rollers 18 upon the sides of the curved and straight guide rails 16 and 17 and this swinging movement, especially of the front end of the carriage, is only such as equals the curvature of the outline of a stave, a matter of approximately less than two inches. Now as the saw is a flat disk, it, in cutting on a curved line, is subjected to undue friction and strain requiring excessive power to rotate it and producing a rough kerf unless presented bodily in a direct line, without torsion, with its cutting edge or periphery. To accomplish this, my invention automatically swings the carriage frame and the saw arbor thereon, during the cutting or sawing, so as to overcome the objections mentioned. In my invention, the distance from the saw arbor belt pulley to the guide pulleys 40 is such that notwithstanding the variation of the former from parallelism with the latter, the belt is not thrown from the arbor pulley if a sufficient tension upon the belt is preserved.

The carriage may be moved by any desired means, a preferable form thereof being herein shown, and comprising the sector 20 pivoted at 21 upon the lower portion of the frame and provided with a plurality of grooves 22 adapted to receive the connecting cables 23 which pass over idlers 24 and are connected to brackets 25 upon the under side of the carriage by means of the adjustable bolts 26. These bolts may be adjusted to the desired extent to compensate for the slack in the cables 23. One of these cables is secured to each end of the sector 20, as shown by dotted lines in Fig. 1, and the oscillation thereof produces a reciprocation of the carriage in opposite directions. For the purpose of securing the oscillation of the sector, it is connected by a pitman 28 extending to a crank arm 29 upon the shaft 30 which is mounted in the machine frame, and provided with the gear 31 meshing with the pinion 32 upon the countershaft 33, which shaft is provided with driving pulley 34 from which a belt 35 extends to the pulley 36 upon the main driving shaft 37 disposed at one end of the machine. This arrangement provides for the necessary reduction of speed in the travel of the carriage. The shaft 37 is also provided with the driving pulley 38 from which a belt 39 extends for the purpose of driving the saw. This belt is carried over idlers 40 mounted in a slack adjuster 41 which travels in ways 42 diagonally disposed within the frame of the machine so as to exert at all times the necessary tension upon the driving belt in the different positions of the saw and its carriage. The belt 39 extends upward from the idlers 40 and over the pulley 43 upon the shaft 44 of the saw 13.

At one side of the machine a stave support 45 is provided and adapted to receive a stave 46 thereon, as shown in Fig. 1. This stave contacts at one end with a stop 47 and may be held in contact with the saw by means of the arms 48 carried by the rock shaft 49 pivotally mounted at 50 upon the machine frame. The upper portion of these arms are provided with handles 51, and above the support 45 a guard rail 52 is extended to prevent contact of the arm of the operator with the saw. The main driving shaft 37 is provided with the usual fast and loose pulleys 53 to control the application of power thereto.

In the operation of the invention, the stave to be jointed is placed upon the rest and power applied to reciprocate the carriage which by its connection with the curved guide rail is given a movement upon the arc of a circle similar to that which is to be given the stave. The cut upon one side of the stave is secured in the movement of the saw in one direction, for instance, from left to right, as shown in Fig. 1, and the operator then turns the stave to the position shown in Fig. 6 during the return movement of the carriage so that in the subsequent movement toward the left the desired curve is given the opposite edge of the stave thus producing the finished product, as shown in Fig. 7. By jointing the stave upon one side at a time, any desired width of staves can be cut because the holding arms are adapted to engage either the curved or the flat face of the stave, and may be varied in relation to the path of travel of the saw so as to effect a curved face upon the opposite edges of the stave with an even width at both ends thereof. The curved guide track 16 has the contour of the desired bilge for the stave and causes the end of the carriage which carries the saw, and consequently the saw, to describe the desired curve for the stave edge.

It is, however, important that the plane of the saw should be maintained at an angle normal to the radius of the curve in which the edge of the saw meets the work and the guide track 17 arranged tangentially to the curve of track 16, guiding the rear end of the carriage tends to shift the plane of the saw about that point on its edge doing the cutting at the time, and maintains it at the proper angle normal to the radius of curvature of track 16. The slack adjuster is adapted to reciprocate on its ways in the different positions of the saw carriage to always maintain the driving belt for the saw under proper tension irrespective of the position of the saw arbor relative to the adjuster. The structure of a machine embodying a traveling circular saw obviates the necessity of any manual operation and greatly reduces the loss of material, while effecting a cut on a true arc thus giving perfect joints between the staves in assembling them in the formation of a barrel or similar article. The invention therefore presents a simple, efficient and economically constructed machine for jointing barrel staves.

Having described my invention and set forth its merits, what I claim and desire to secure by Letters Patent is:—

1. In a stave jointing machine, a frame, a carriage mounted to travel thereon and provided with a saw, a work support at one side of said frame, a curved guide rail disposed upon said frame opposite said support, means depending from said carriage to engage said rail, and means for maintaining said saw in a plane at an angle normal to the radius of the curved path in which the cutting edge of the saw travels.

2. In a stave jointing machine, a frame, a carriage mounted to travel thereon and provided with a saw, a work support at one side of said frame, a curved guide rail contacting with one end of said carriage, and an independent guide rail disposed at one end of the curved guide rail and contacting with the opposite end of the carriage and operating to maintain the saw in a plane at an angle normal to the radius of the curved path in which the cutting edge of the saw lies.

3. In a stave jointing machine, a frame, a carriage mounted to travel thereon and provided with a saw, a work support at one side of said frame, a curved guide rail contacting with one end of said carriage, a straight guide rail extended beyond one end of the curved rail, and rollers carried by said carriage to engage said straight rail and operating to maintain the saw in a plane at an angle normal to the radius of the curved path in which the cutting edge of the saw lies.

4. In a stave jointing machine, a frame, a carriage mounted to travel thereon, a saw mounted upon said carriage, means for guiding the front end of said carriage in a curved path, and means for so moving the rear end of said carriage as to maintain the plane of the saw at an angle normal to the radius of the curved path in which the cutting edge of the saw lies.

5. In a stave jointing machine, a frame, a carriage mounted to travel thereon, a saw mounted upon said carriage, means for guiding the front end of said carriage in a curved path, means for so moving the rear end of said carriage as to maintain the plane of the saw at an angle normal to the radius of the curved path in which the cutting edge of the saw lies, a driving belt having guiding means beneath said carriage to permit a lateral movement of the belt in its travel in a curved path, and means for reciprocating said carriage.

6. In a stave jointing machine, a frame, a carriage mounted thereon provided with a saw and means to cause the carriage to travel in a curved path, a work support at one side of said carriage, and further means for so moving said saw as to maintain the plane thereof at an angle normal to the radius of the curved path in which the cutting edge of the saw lies.

In testimony whereof I affix my signature in presence of two witnesses.

NOAH M. TAYLOR.

Witnesses:
 GENEVA W. THOMPSON,
 F. B. WEEKS.